United States Patent

Mac Intosh et al.

[11] 3,946,560
[45] Mar. 30, 1976

[54] HYDROSTATIC TRANSMISSION CONTROL

[75] Inventors: Donald J. Mac Intosh; Edward L. Stout, both of Ames, Iowa

[73] Assignee: Sundstrand Corporation, Rockford, Ill.

[22] Filed: Mar. 17, 1975

[21] Appl. No.: 559,301

Related U.S. Application Data

[63] Continuation of Ser. No. 442,190, Feb. 13, 1974, abandoned.

[52] U.S. Cl. .................. 60/421; 60/428; 60/490; 180/6.3; 180/6.48
[51] Int. Cl.² .................................... F16H 39/46
[58] Field of Search ............. 60/420, 421, 428, 429, 60/430, 486, 487, 488, 490; 180/6.48

[56] References Cited
UNITED STATES PATENTS

| | | | |
|---|---|---|---|
| 2,651,377 | 9/1953 | Lapsley et al. | 180/6.3 |
| 2,774,434 | 12/1956 | Ferris | 180/6.3 |
| 3,677,362 | 7/1972 | Chatterjea | 180/6.48 |
| 3,727,402 | 4/1973 | Keith et al. | 60/444 |
| 3,795,109 | 3/1974 | Bojas et al. | 60/490 |

*Primary Examiner*—Edgar W. Geoghegan
*Attorney, Agent, or Firm*—Wegner, Stellman, McCord, Wiles & Wood

[57] ABSTRACT

A hydrostatic transmission control for a hydrostatic transmission having a variable displacement pump and a variable displacement motor including pressure-responsive displacement control means for the pump and motor with a displacement control valve for each of the pump and motor and positionable by a control pressure to set the displacement of the pump or motor with which it is associated. In dual path control of two hydrostatic transmissions, a master circuit has a first valve for setting a control pressure to determine the speed of operation of the transmissions and a second valve for determining the direction of operation of the transmissions, with operation of both valves by a single control handle. The master circuit connects into two branch circuits, each leading to the displacement controls for one of the hydrostatic transmissions and with each branch circuit having its own steering control valve. The steering operation is controlled by an additional pair of handles associated one with each of the pair of steering control valves. Each of the steering control valves provides for a reduction in a control pressure for reduced speed of the associated hydrostatic transmission or reversal of flow of control pressure fluid to obtain the reverse direction of operation of one of the transmissions.

18 Claims, 7 Drawing Figures

HYDROSTATIC TRANSMISSION CONTROL

CROSS-REFERENCE TO RELATED APPLICATION

This application is a continuation of U.S. Ser. No. 442,190, filed Feb. 13, 1974, now abandoned.

BACKGROUND OF THE INVENTION

This invention pertains to hydrostatic transmission controls for obtaining precise displacement of the variable displacement pump and motor of the transmission and, additionally, for providing accurate, uniform operation as well as steering control of a dual path hydrostatic transmission. The controls are usable in many applications, including track-type vehicles for obtaining both propulsion and steering thereof.

The assignee of this application has a number of prior art patents relating to hydrostatic transmissions. In considering the appropriate prior art, it should be noted that the disclosure herein relates to a hydrostatic transmission control and, more particularly, a dual path hydrostatic transmission control wherein a master circuit including a pressure-reducing valve for setting the control pressure and a directional control valve for establishing the direction of operation of two hydrostatic transmissions as well as a horsepower control valve for preventing stalling of the prime mover connect into two branch circuits with a branch circuit for each of the hydrostatic transmissions and each branch circuit having a steering control valve. The steering control valves provide for modification of the control pressure delivered to the displacement control means of a particular hydrostatic transmission and with a staging action in each transmission whereby the pump of the transmission reaches substantially full displacement prior to reduction in the initial maximum displacement of the motor.

Moon U.S. Pat. No. 3,187,509 discloses a displacement control valve in FIG. 2 which functions as a directional valve and which is in circuit with a manually-controllable torque valve 130. The latter valve functions as a manually-adjustable pressure-reducing valve. This patent does not disclose a dual path control with a master circuit having speed and direction establishing components operable by a single handle and a pair of branch circuits each having a manually-operable steering control valve nor a number of specific features in the displacement control for a transmission providing for precise displacement control.

The Hann et al U.S. Pat. No. 3,230,699 discloses a hydrostatic transmission wherein the reduction in motor displacement is staged to follow the increase in displacement of the pump by having a spring associated with the control valve for the motor stronger than a similar spring in the control valve for the pump. This patent also shows a rotatable shaft with cams for modifying the action of valves.

The Hann U.S. Pat. No. 3,247,669 discloses the use of springs of different strength in the displacement controls for the motor and pump of the hydrostatic transmission in order to stage the operation of the motor after the operation of the pump.

The Hann U.S. Pat. No. 3,411,297 discloses the use of a staging valve 21 for causing change in the displacement of the motor after the pump is adjusted to maximum displacement. This control does not include a shuttle valve for shift in response to a higher control pressure in one of two lines for assuring application of the higher control pressure at all times to one end of the control valve for the motor displacement control. Additionally, this patent shows a feedback linkage associated with the pump.

The Moon U.S. Pat. No. 3,247,919 and Ross U.S. Pat. No. 3,349,860 relate to dual hydrostatic transmissions. In the Moon patent, one handle provides for speed control of both transmissions and a second handle provides for steering. The handles operate control cams for mechanically-modifying the operation of the transmissions. The control cams which set the speed and direction of operation have their actions modified when steering control is desired. In the Ross patent, steering is obtained by use of a separate hydrostatic transmission which operates to provide an input into a differential.

Additionally, the assignee of this application has a previous dual-path hydrostatic transmission control wherein each hydrostatic transmission is manually controlled by a separate control circuit and with each control having a pressure-reducing valve to set a control pressure and a directional control valve for determining the direction of operation of the associated hydrostatic transmission. A horsepower or antistall control valve is connected into the control circuits for both of the hydrostatic transmissions, whereby overloading of the engine will result in a uniform reduction in control pressure in the controls for both of the hydrostatic transmissions. In this prior art control, there are two control handles, with each handle independently setting a speed for a transmission, whereby there is no positive direct relation between the speeds of the two transmissions.

An additional prior art patent is Lauck, U.S. Pat. Re. No. 27,488 wherein two distinct controls, such as described in the preceding paragraph, are operated by a single master control handle. In this patent, the control for each hydrostatic transmission has its own speed control and direction-establishing means as well as a horsepower control valve.

SUMMARY

An important feature of the invention resides in the dual path control for a pair of hydrostatic transmissions wherein a master control circuit operable from a single control handle sets a control pressure to establish a speed common to both hydrostatic transmissions and also a direction of operation thereof and with two branch circuits associated one with each of the hydrostatic tranmissions and each having a manually-operable steering control valve for varying the speed of one transmission with respect to the other for steering of a vehicle, such as a double-track vehicle, with there being a track driven by each of the hydrostatic transmissions.

Another feature of the invention provides for operation of a steering control valve in a branch circuit to modify a control pressure for the associated hydrostatic transmissions for speed variation to cause a turn, with the additional feature of valve operation reversing the application of control pressure to a hydrostatic transmission whereby the vehicle may be given a spin turn about a center disposed within the space between the tracks.

The control of the speed of the hydrostatic transmissions is controlled by a pressure-reducing valve in the master control circuit, with this valve including means settable to determine the desired control pressure for setting speed. A manually-operable handle has a cam associated therewith coacting with the settable means and with the cam surface having two similar sections extending oppositely from a neutral center position whereby rotation of the handle in either direction to establish a direction of operation of the hydrostatic transmissions will effectively set a control pressure to establish the speed of the transmissions dependent upon the amount of handle rotation.

Additional features of the invention include the use of a known horsepower control valve to also function as a relief valve with respect to pressure generated by a control pump operated by the prime mover engine, as well as improvements in the displacment control means for the swashplates of the variable displacement pump and variable displacement motor of the transmission, including a pair of springs acting in opposition against a control arm connected to a control valve of the displacement control means with adjustable structure for the spring seat of one of the springs in order to obtain a null position for the control valve when the associated swashplate is in neutral, and the use of a shuttle valve between the displacement controls for the pump and motor which are in series. The shuttle valve operates to direct the highest control pressure existing in either of two lines ahead of the shuttle valve to one end of a control valve for motor displacement whereby the motor is always adjusted in the same direction.

A further feature of the invention resides in the utilization of feedback means for the control valve in the displacement control for the motor which provides for a certain non-linear relation between transmission speed and motor displacement in order to obtain a linear relation between transmission speed in response to control pressure. This assures a uniform control of speed as a control pressure is varied by a steering control valve.

DESCRIPTION OF THE PREFERRED EMBODIMENT

Figure 1:
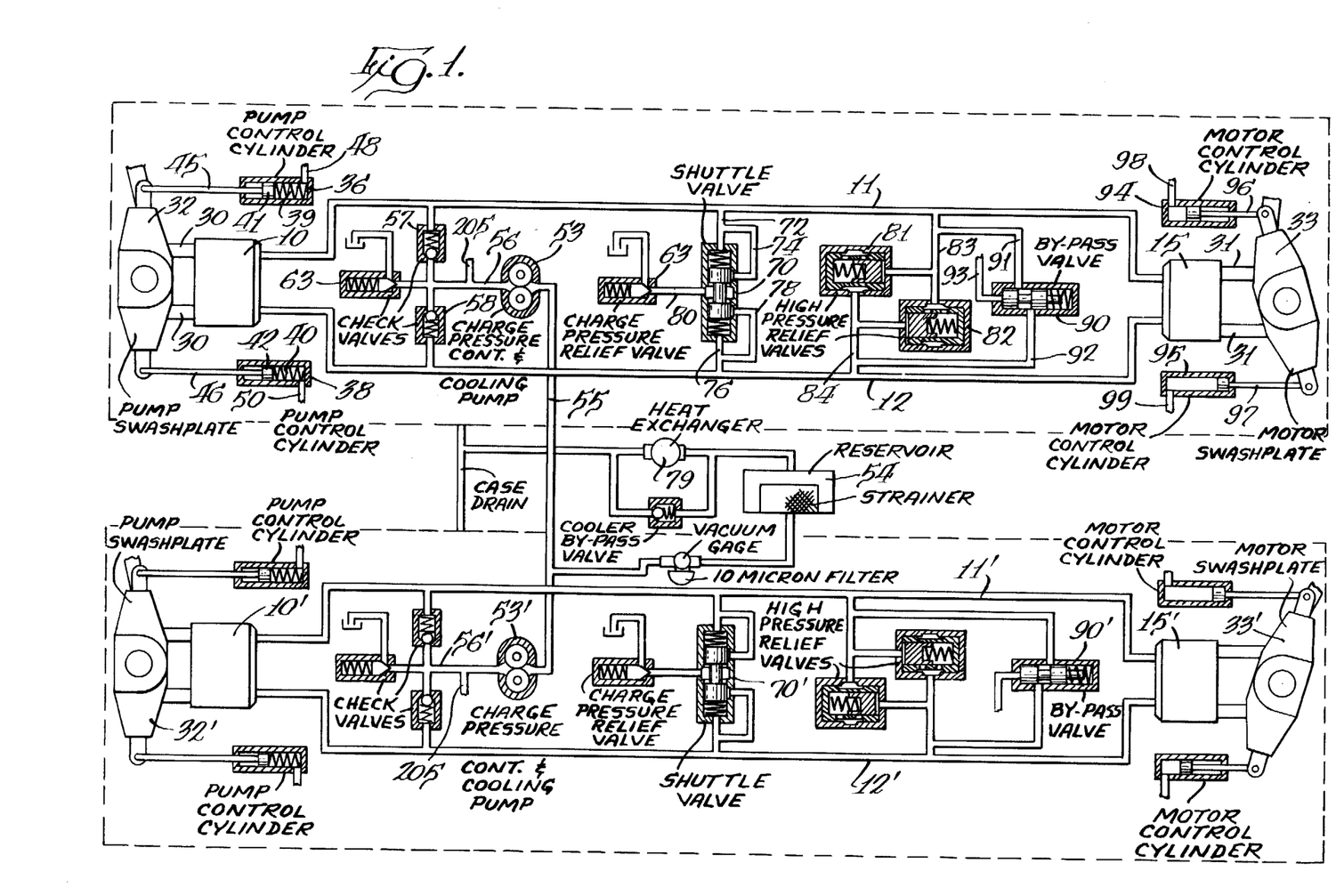
FIG. 1 is a diagrammatic illustration of a dual-path hydrostatic transmission with two complete hydrostatic transmissions.

A dual path hydrostatic transmission is shown in FIG. 1. These transmissions, in one embodiment, may be used to each individually operate a track of a dual track vehicle. Referring to the hydrostatic transmission, illustrated in the upper half of FIG. 1, a variable displacement pump 10 is connected by a pair of lines 11 and 12 to a variable displacement motor 15. The variable displacement pump 10 has an input shaft (not shown) driven from a power source, such as the engine of the vehicle, with the motor 15 having an output shaft (not shown) connectable to a drive train, such as for a track of the vehicle.

Preferably, both the pump 10 and motor 15 are of the axial piston type having rotatable cylinder blocks, each with a plurality of cylinders in annular array and with pistons 30 and 31, respectively having ends reciprocable in the cylinders. The pump 10 has a variable angle reversible swashplate 32 engaged by the projecting ends of the pistons 30 for initially controlling the speed of the transmission as well as the direction of rotation thereof. The motor 15 has a variable angle swashplate 33 movable from a maximum displacement position shown to a minimum displacement position somewhat greater than zero. The swashplate 33 engages pistons 31 causing reciprocation thereof and rotation of the cylinder block and the output shaft of the motor connected thereto as high pressure fluid is supplied to the motor from the pump.

A pair of pump control cylinders 36 and 38 are provided for positioning the pump swashplate 32. Each has a spring construction, indicated diagrammatically at 39 and 40, respectively, acting against pistons 41 and 42. The pistons 41 and 42 pivot the swashplate 32 through links 45 and 46 connected to the pistons. The control cylinders 36 and 38 position the swashplate in response to the supply of operating fluid to the cylinders by means of conduits 48 and 50, respectively. The centering springs 39 and 40 normally act through the pistons to position the pump swashplate as shown in its neutral position when no operating fluid is delivered through the conduits. In this position, there is no positive output from the pump. The control cylinders are of a conventional, single-action type so that the entry of fluid under pressure into one cylinder will cause the swashplate to tilt or pivot in one direction, and the influx of fluid under pressure in the opposite cylinder will cause reverse pivoting of the swashplate, thus permitting the flow from the pump 10 to reverse and, consequently, the output of the motor is reversed.

A positive displacement charge pressure pump 53 is provided and is given through suitable means by the engine, or prime mover, of the vehicle or other device using the transmission. The pump 53 is in communication with a reservoir 54 through an intake conduit 55 and has a discharge conduit 56. The capacity of the charge pump 53 is sufficient to replace leakage fluid, and to supply operating fluid to a pair of control valves of the displacement control for the pump and motor (hereinafter described) and to supply cooling fluid to the hydrostatic transmission in excess of that required for the aforementioned purposes in order to maintain the transmission cool. Additionally, the pump develops a pressure sufficient whereby the force in the cylinders for positioning the swashplates of the pump and motor may exceed the forces tending to move the swashplate as created internally by the action of the pump and motor.

A pair of spring-biased check valves 57 and 58 are in communication with the conduit 56 and with the main lines 11 and 12, respectively, interconnecting the pump and the motor. The check valves 57 and 58 permit the supply of replenishing and cooling fluid to the low pressure side of the transmission circuit through one check valve while pressure in the high pressure line will maintain the other check valve closed. A spring-based, make-up relief valve 63 communicates with the conduit 56 and serves to relieve excess fluid. For establishing a ciricuit between the main lines 11 and 12 that is at low pressure and a low pressure relief valve 63, a shuttle valve 70 is provided. The shuttle valve is in communication with the lines 11 and 12 by means of the conduits 72, 74, 76, and 78 and provides a means for removing heated oil displaced by cooling oil supplied by the charge pump 53. The fluid pressure in the lines 11 and 12 acts through the conduits 72 and 76, respectively, to appropriately position the shuttle valve 70 so that communication is established to the low pressure relief valve through a conduit 80 from the low pressure side of the transmission circuit, by means of either the conduit 74 or the conduit 78, so that the heated fluid may be drained to the reservoir, passing through the heat exchanger 79. Shuttle valve 70 is spring-centered to a closed position so that during the transition of reversing of pressure in the main lines, none of the high pressure oil is lost from the circuit.

The transmission includes over-pressure relief valves 81 and 82 in communication with each of the main lines by the conduits 83 and 84. The valves serve to prevent abnormally high pressure in either of the two main lines 11 and 12 by relieving the circuit of surge pressures which may occur during rapid acceleration or abrupt braking. In response to this high pressure, the over-pressure relief valves shift to dump the excess oil to the low pressure side of the transmission circuit. For example, when excessive high pressure exists in line 11, fluid pressure in conduit 83 will cause the valve 81 to shut the fluid to line 12 through the conduit 84.

A bypass valve 90 is connected into conduits 83 and 84 by a pair of conduits 91 and 92 and, by a conduit 93, is connected to the outlet of the charge pump 53. In the event of loss of pressure from the charge pump, the bypass valve shifts to connect conduits 91 and 92 and short-circuit the system to result in a free-wheeling condition of operation.

The motor 15 has a pair of operating cylinders 94 and 95 containing piston and link elements 96 and 97 pivotally connected to the swashplate 33 and with conduits 98 and 99 connected to their respective cylinders for delivery of operaitng fluid thereto.

The second hydrostatic transmission, shown in the lower half of FIG. 1, is of the same construction as that just described and is supplied with fluid from the reservoir 54 through the conduit 55. Corresponding structural elements of the second hydrostatic transmission have been given the same reference numeral with a prime affixed thereto.

Figure 2A:
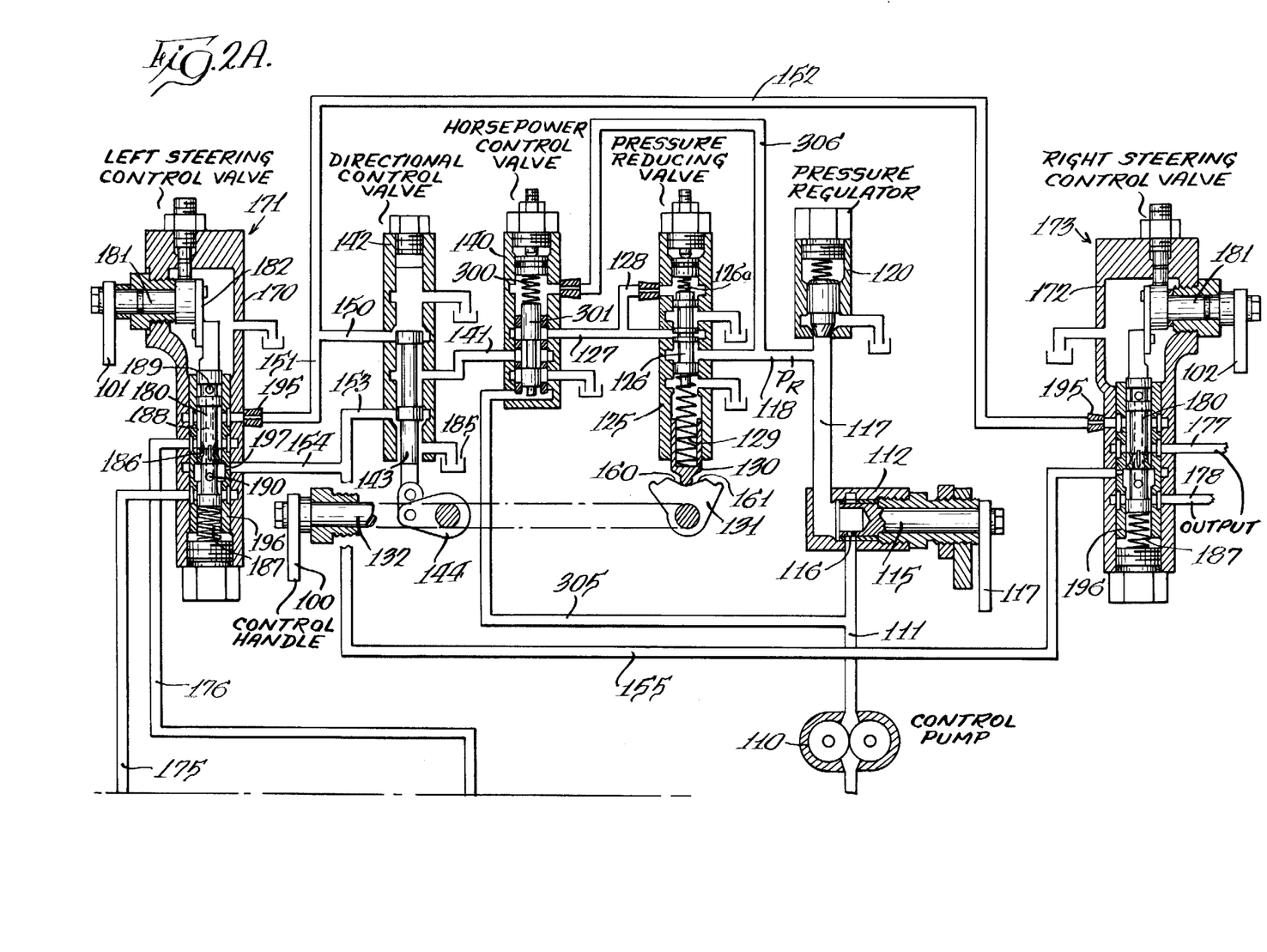
FIG. 2A is a diagrammatic view of a part of the control system for the dual-path hydrostatic transmission.

The dual path control system is shown primarily in FIG. 2A and, more specifically, the master control circuit for setting the speed and direction of operation of the two hydrostatic transmissions shown in FIG. 1. FIG. 2A additionally shows a pair of branch circuit extending from the master control circuit including structure to provide steering capability. The control system is operated by means of three control handles. A control handle 100 is operable to set the speed and direction of operation. A control handle 101 is operable to establish a modification in speed of one transmission or direction of operation thereof for steering capability in one direction of turn and a third handle 102 is operable to control the speed and direction of operation of the other hydrostatic transmission for steering capability in the other direction of turn.

The master control circuit includes a control pump 110 suitably driven by a prime mover, such as an engine of a vehicle, to deliver control fluid used to establish a control pressure for the system. The output of the control pump 110 is directed through a conduit 111 to a variable orifice valve 112 having a rotatable member 115 with a variable orifice 116. The position of this valve is set through a connection 117 to the throttle linkage of the engine (not shown) to provide a pressure differential across the valve dependent upon the setting of the engine and with the variable orifice opening varying directly relative to the throttle setting. The pressure differential is constant for each engine setting at rated speed. The valve functions to signal speed of the engine and, if the engine speed decreases from that normally obtained by the throttle setting, there is a lowered output flow from the control pump 110 which results in a lowering of the pressure differential across the variable orifice. A conduit 117 extends from the variable orifice valve 112 to a pressure regulator valve 120 which assures adequate back pressure downstream of the variable orifice valve 112 in order to operate the control system, and further provides a regulated constant pressure in a conduit 118 and which is designated $P_R$. The conduit 118 extends to a pressure-reducing valve 125 (ratio control valve), with this valve functioning to establish a control pressure for obtaining a uniform speed control of both hydrostatic transmissions. The pressure-reducing valve 125 includes a valve spool 126 which controls communication between the inlet conduit 118 and an outlet conduit 127. The valve spool 126, at one end, is subjected to outlet pressure therefrom through a conduit 128 having a flow restriction as well as an adjustable spring 126a and, at the opposite end, is acted upon by a spring 129. The spring is partially positioned within a cylindrical member 130 movable within the housing of the valve and having an end engageable by a speed-setting cam 131 connected to a shaft 132 which is rotatably positioned by the manually operable handle 100.

The cam 131 has a pair of oppositely-inclined cam surface sections 160 and 161 extending upwardly in opposite directions from the neutral portion of the cam which is shown in engagement with the member 130 in FIG. 2A. The control pressure fluid delivered from the pressure-reducing valve 125 by conduit 127 is directed to a horsepower control valve 140 which has, as a primary function, prevention of stalling of the prime mover, such as the engine of a vehicle, and, thus, also may be referred to as an anti-stall valve. A conduit 141 extends from the anti-stall valve to a directional control valve 142 having a valve spool 143 positionable by a linkage 144 operatively connected to the shaft 132 rotatably positionable by the manually-operable handle 100. The position of the valve spool 143 determines the normal direction of operation of the hydrostatic transmissions.

The foregoing structure shown in FIG. 2A constitutes the master control circuit whereby positioning of the handle 100 determines the normal direction of operation and a basic common and uniform speed for the two hydrostatic transmissions. A first outlet conduit 150 from the directional control valve 142 branches into a pair of conduits 151 and 152 leading to branch circuits associated, one with each of the hydrostatic transmissions. A second conduit 153, extending from the directional control valve, has two branch conduits 154 and 155 also extending to the respective hydrostatic transmissions. In the illustrated position of stem 143, line 141 is blocked and lines 150, 153 are drained.

When the shaft 132 is rotated from the position shown in FIG. 2A by force applied to the handle 100, the valve spool 143 of the directional control valve is shifted from the position shown to direct control pressure fluid at a set pressure to one of the conduits 150 and 153 and operate the transmissions in one direction, or flow may be directed to the other conduit causing operation in the opposite direction. The two sections 160 and 161 of the cam surface of cam 131 are mirror images of each other, whereby rotation of the shaft 132 in either direction will result in compressing of the spring 129 of the pressure-reducing valve 125 to a similar degree to set a control pressure of a desired value for speed of operation of the hydrostatic transmissions.

The branch conduits 151 and 154 from the master control circuit connect to the housing 170 of a steering control valve, indicated generally at 171, while the corresponding branch conduits 152 and 155 connect into the housing 172 of a steering control valve, indicated generally at 173. The steering control valve 171 has a pair of conduits 175 and 176 extending therefrom and to the pump and motor displacement control shown in FIG. 2B. The steering control valve 173 has a similar pair of conduits 177 and 178 which extend to the displacement control (not shown) for the pump and motor of the other transmission. Each of the steering control valve is of the same construction, as are the displacement controls for the pump and motor of the hydrostatic transmissions and, therefore, the steering control valve 171 and the displacement control shown in FIG. 2B for the transmission shown in the upper part of FIG. 1 will be described in detail with the understanding that there is the same structure for the other hydrostatic transmission.

The control pressure signal is delivered to one or the other of the branch conduits 151, 154, dependent upon the position of the directional control valve 142, with these conduits communicating with a bore in the valve housing 170 which movably mounts a valve spool 180. The position of the valve spool 180 is controlled by the handle 101, with the handle being connected to a rotatable shaft 181 which carries an eccentrically pivoted link 182 which is pivotally connected to the upper end of the valve spool 180. In the position of the valve, as shown in FIG. 2A, and assuming control pressure is supplied to branch conduit 151, the control pressure fluid enters the valve bore and, by flow around a reduced portion of the valve spool, flows to the conduit 176 leading to the displacement control. This supplies full control pressure to the displacement control. Supply of full control pressure provides for operation of the associated hydrostatic transmission at a desired speed, as determined by the setting of the control pressure by the pressure-reducing valve 125. In one direction of vehicle turning, the speed of the hydrostatic transmission associated with the steering control valve 171 is reduced. The handle 101 is operated to move the valve spool 180 downwardly, as shown in FIG. 2A, with the result that a certain amount of the control pressure fluid is metered or bypassed to the branch conduit 154 which connects to a tank port 185 associated with the directional control valve 142 because of the latter valve having its spool 143 in an upshifted condition from that shown in FIG. 2A. This reduces the control pressure to reduce the speed. This metering flow is across a land of the valve spool 180 which is provided with external slots 186 on the land which function as a variable orifice, with the slots increasing in size as the valve spool 180 is lowered from the position shown in FIG. 2A to gradually reduce the control pressure delivered through the conduit 176 to the displacement control. These slots do not extend for the full length of the land, whereby the land is continuous at the lower part thereof as viewed in FIG. 2A.

The valve spool 180 has two limit positions, with the upper limit position shown in FIG. 2A, and with an opposite limit position being in a full lowered position of the valve spool against the action of a spring 187 in the valve housing. In the fully-lowered position, there is a reversal of flow of the control pressure fluid with respect to output conduits 175 and 176 whereby direction of operation of the associated hydrostatic transmission is reversed. This action occurs by connecting an internal passage 188 in the valve spool 180 between the branch conduit 151 and the conduit 175 by means of a pair of radial openings in the valve spool which extend the internal passage 188 to the surface of the valve spool, with these openings being indicated at 189 and 190. This results in reversing the direction of operation of the associated hydrostatic transmission whereby a spin-turn of the vehicle will result, with the vehicle turning about an axis between the two tracks thereof.

If the directional control valve 142 is downshifted to obtain an opposite direction of operation of the hydrostatic transmission, then pressure is supplied to the branch conduit 154 leading to the steering control valve 171 and in the position of the latter valve, as shown in FIG. 2A, full control pressure is delivered through the conduit 175 leading to the displacement control. Similarly, the control pressure may be reduced by metering or bypass as the valve spool 180 is lowered by the slots 186 on the land of the valve spool and the direction of operation may be reversed by further downward movement of the valve spool 180 until the land having the slots 186 blocks the branch conduit 154 from the conduit 175 whereby the control pressure signal will then be delivered to the conduit 176 to obtain the opposite direction of operation of the hydrostatic transmission.

The magnitude of control pressure reduction depends upon the relative size of an orifice 195 in the branch conduit 151 and the porting characteristics of the valve 171. A sleeve 196 positioned in the bore of the valve housing and which movably receives the valve spool 180 is provided with suitable flow passages and preferably an orifice passage 197 in communication with branch conduit 154 which reduces the tolerance effects of orifice size.

Figures 2B, 5:
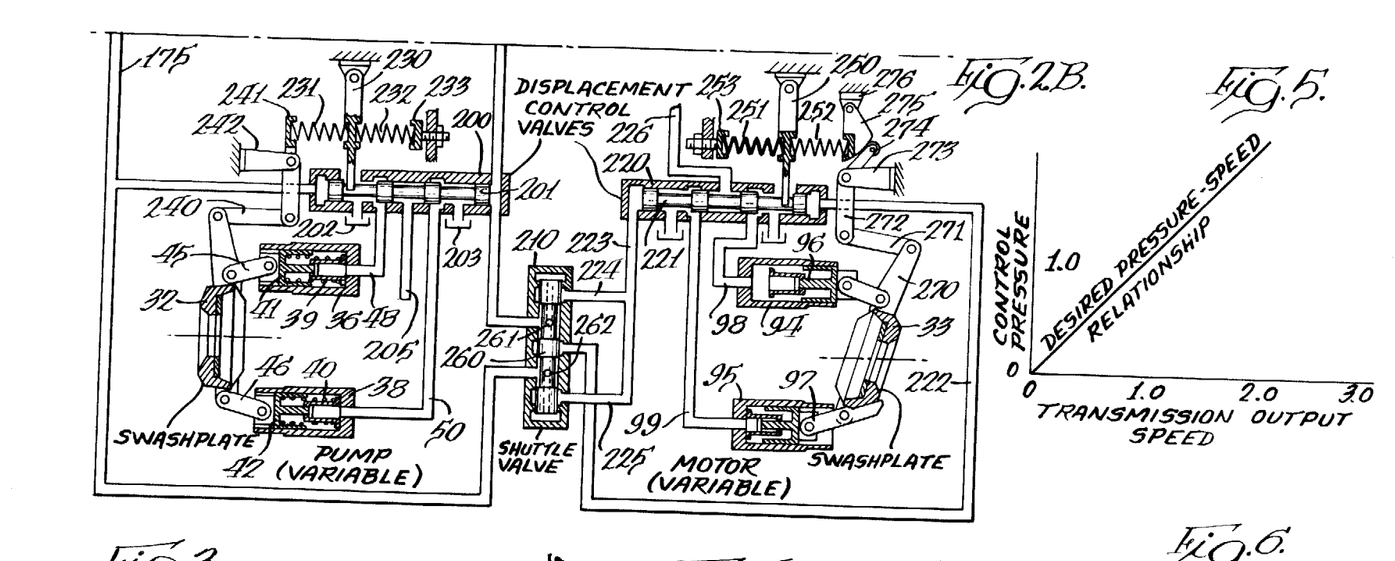
FIG. 2B is a diagrammatic view of the displacement controls for one of the hydrostatic transmissions and which connects into the left-hand side of FIG. 2A.
FIG. 5 is a graph showing the desired linear relationship between control pressure and output speed for a hydrostatic transmission.

As shown in FIG. 2B, the conduits 175 and 176 extending from the steering control valve 171 connect into opposite ends of a displacement control valve 200 to effect the positioning of a control valve 201 movable within the housing of the valve. The control valve 200 additionally has a pair of tank connections 202, 203 as well as connections to the conduits 48 and 50 leading to the pump control cylinders 36 and 38, previously described. Operating fluid is delivered to the control valve through a conduit 205 FIGS. 1 and 2B which is supplied by the charge pump 53 of FIG. 1 with the outlet conduit 56 thereof connecting into the conduit 205.

The swashplate 32 for the pump is shown in a centered condition in FIG. 2B as caused by the springs 39 and 40 within the cylinders. Assuming that a control pressure signal directed to conduit 176 provides for operation of the hydrostatic transmission in a forward direction, this will result in control pressure shifting the valve spool 201 to the left from the position shown in FIG. 2B whereby operating fluid from conduit 205 is directed to the conduit 48 and the piston 41 is caused to move to shift the swashplate 32. Alternatively, if the control pressure signal is delivered to conduit 175, the control pressure signal is applied to the left-hand end of the valve spool 201 to shift it to the right, as viewed in FIG. 2B, whereby operating fluid from conduit 205 is applied to the piston 42 to shift the swashplate in the opposite direction. The conduits 175 and 176, in addition to connecting into the control valve 200, extend to a shuttle valve 210. The shuttle valve 210 functions to port the highest control pressure existing in either of conduits 175 or 176 to one end of the displacement control valve for the swashplate of the motor whereby the motor swashplate always adjusts in the same direction.

A control valve 220 of the motor displacement control has a valve spool 221, with the right-hand end thereof always being subjected to the highest control pressure through a conduit 222 extending from the shuttle valve 210. The opposite end of the control valve has a conduit 223 with branch conduits 224 and 225 connected to the shuttle valve 210. The control valve 220 is of the same construction as the control valve 200, with there being a pair of tank connections and also a conduit 226 which branches off from the conduit 205 connected into the outlet from the charge pump 53 to provide operating fluid for operation of the displacement control for the motor swashplate.

Referring to the displacement control for the pump, the valve spool 201 is shown in a neutral position with the swashplate 32 in neutral position and with the position of the valve spool partially being controlled by a pivoted arm 230 which is connected to the valve spool for movement with it and which has a pair of springs 231 and 232 engaging against opposite sides of the arm and acting in opposition to each other. The null position of the valve spool with the swashplate 32 in neutral is set by rotatable adjustment of a threaded seat member 223 for the spring 232, with the rotatable adjustment either advancing or retracting the spring seat 233 to vary the compression of the spring 232 in action against the spring 231 to obtain the desired null position. Additionally, the displacement control has feedback means including a pivoted linkage 240 including an arm 241 on a fixed pivot 242 and having a seat at an end thereof for the spring 231. As the valve spool 201 is shifted, the control arm 230 is similarly shifted to create an imbalance in the springs 231 and 232. The shift of the spool results in a pivoting of the swashplate 32, which is indicated through the feedback linkage 240 to vary the compressive force on spring 231, whereby when there is again a balance in the spring forces the valve spool 201 will be in a neutral flow-blocking position. This action will be the same regardless of the direction in which the swashplate 32 is pivoted.

As stated previously, the highest control pressure is always directed through conduit 222 to the valve 220 of the motor displacement control whereby the pressure acts to shift the valve spool 221 toward the left as viewed in FIG. 2B. This valve spool has a control arm 250 movable therewith and with a pair of springs 251 and 252 engageable against opposite sides of the control arm and acting in opposition. The spring 251 has an adjustable, threaded spring seat member 253 on a fixed mounting in order to obtain a null position for the valve spool 221. Additionally, the spring 251 is stronger than the springs 231, 232 and 252 whereby the valve spool 221 is normally open to conduit 98 and will not shift in response to a control pressure until the value of that pressure exceeds a control pressure which acts to substantially fully shift the valve spool 201 of the pump displacement control valve. This provides for staging of the components of the transmission whereby the swashplate 32 of the pump which has been at neutral will move to a substantially maximum displacement prior to any movement of the motor swashplate 33. Following maximum displacement of the pump swashplate, the displacement of the motor will be reduced as the control pressure increases.

Figures 4, 6:
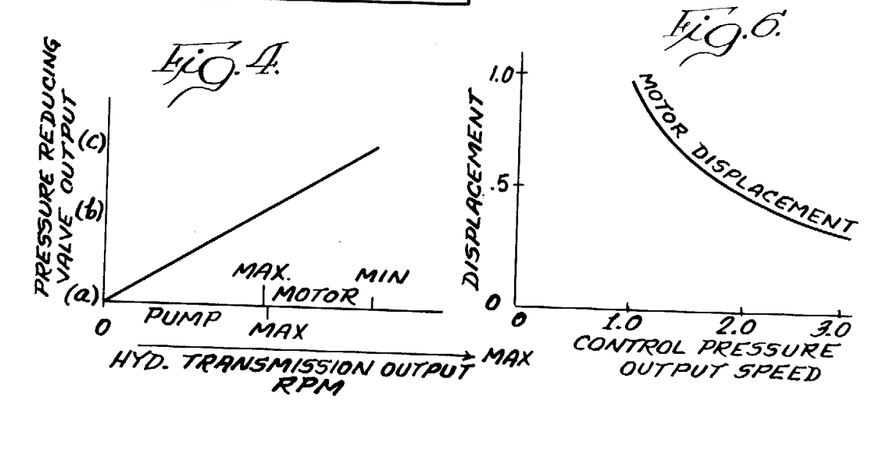
FIG. 4 is a graph showing the staging action of the variable displacement pump and motor of a hydrostatic transmission.
FIG. 6 is a graph showing a non-linear relation between displacement of the motor of the transmission with respect to output speed and control pressure thereof in order to obtain a linear speed-control pressure relation.

This action is shown by the graph of FIG. 4 wherein the control pressure obtained by the setting of the pressure reducing valve 125 is plotted as the ordinate and the displacement of the pump and motor are plotted as the abscissa. As the control pressure increases from ($a$) to ($b$), the displacement of the pump changes from neutral to maximum, as indicated by symbols beneath the abscissa line and at approximately the time the pump achieves full displacement, the displacement of the motor reduces progressively from a maximum to a minimum as the control pressure moves from value ($b$) to ($c$) and as shown by markings above the abscissa line.

The shuttle valve 210 has a valve spool 260 and a pair of internal passages opening to opposite ends thereof and extending to the surface of the valve spool by a pair of radial passages 261 and 262. The last-mentioned passages provide for communication of pressure in conduits 175 and 176 to the respective opposite ends of the shuttle valve spool 260 whereby the greater control pressure will act to shift the shuttle valve. Assuming that the greater control pressure is in conduit 175, the shuttle valve spool 260 will be shifted upwardly whereby the conduit 175 is placed in communication with the conduit 222. If the greater control pressure is in conduit 176, this will be directed to the upper end of the shuttle valve spool to shift the valve downwardly, with the result that conduit 176 will be placed in communication with conduit 222 leading to the control valve 220 of the motor displacement control. In either of the above situations, one or the other of the branch conduits 224 or 225 will be connected to the other of conduits 175 and 176 which will extend back to the steering control valve 171 for suitable connection to tank at the directional control valve 142.

In considering the feedback means of the motor displacement control, reference shall first be made to FIGS. 5 and 6. In order to maintain the same steer radius of a vehicle when changing ground speed while in a turn, there should be a linear relationship between the control pressure and the output speed of the transmission, as indicated in the graph of FIG. 5.

The feedback means for the motor displacement control has a cam to provide the relationship indicated by the graph of FIG. 6 between transmission speed and displacement of the motor in order to result in the linear relation between control pressure and transmission speed shown in the graph of FIG. 5. Without the cam, the relationship between pressure and speed shown in FIG. 5 would not be linear at the higher control pressures whereby it would be possible to have an indirect relation between the speeds of the two hydrostatic transmissions when one of the steering control valves 171 or 173 might be operated to have one transmission operating in a speed range different from the other. This would result in an uncontrolled relation in a turn of the vehicle.

Referring specifically to the feeback means for the motor displacement control shown in FIG. 2B, a linkage connected to the swashplate has an arm 270 connected to the swashplate which, by a link 271, pivots an arm 272 pivotally-connected to a fixed bracket 273 with a cam roller 274 on the end of the arm 272. A cam 275 pivoted on a fixed mount 276 carries a spring seat for the spring 252 and has a cam surface coacting with the cam roller 274.

The action of the cam 275 results in obtaining a relatively small change in the compression exerted on spring 252 when displacement of the motor varies near the maximum displacement range of operation of the motor, with there being a greater rate of change of compression of the spring 252 in response to a given control pressure signal when the motor is operating toward the minimal displacement range of operation. Thus as the swashplate 33 pivots counterclockwise as viewed in FIG. 2B, the cam 275 also pivots counterclockwise to reduce the compression on the spring 252 until there is a balance obtained to bring the control spool 221 to a neutral position wherein operating fluid from conduit 226 is blocked from communication with the operating cylinders 94 and 95. This balance is obtained when the control pressure acting on the right-hand end of the control spool 221 plus the force of spring 252 equals the force of the stronger spring 251 and any force resulting from pressure acting against the left-hand end of the control spool 221.

It will be obvious that the cam and cam roller relation shown in FIG. 2 could be reversed whereby the cam could be associated with the feedback linkage and the follower associated with the spring seat.

A cam, such as cam 275, designed for a hydrostatic transmission using a single variable displacement motor with a variable displacement pump, will provide the desired relation shown in FIG. 5 regardless of pump size or input speed. The only requirement is that the actual control pressure to produce full pump displacement be similar for different pump sizes. Similarly, the same cam can be used for different motor sizes as long as suitable feedback linkage is used in order to produce the relationship shown in FIG. 6.

Figure 3:
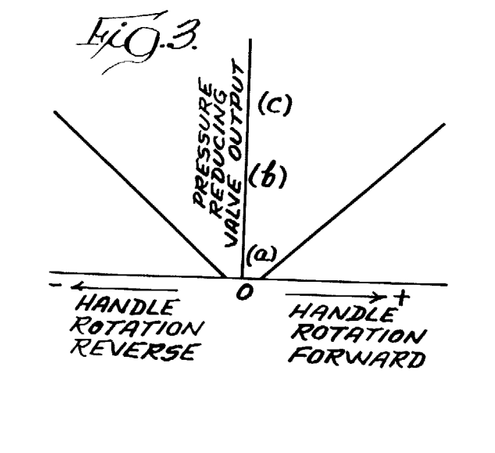
FIG. 3 is a graph illustrating the speed setting and direction of operation of the hydrostatic transmissions in response to positioning of the manual control handle.

In the control system as now described, a single control handle 100 controls components of the master control circuit to establish a uniform control pressure and, therefore, a uniform speed for both of the hydrostatic transmissions as well as the direction of operation thereof. With operation of the control handle 100 and rotation of the shaft 132, the control valve 142 is appropriately positioned and either of the cam surface sections 160 and 161 of the speed-setting cam 131 controls the force of the spring of the pressure-reducing valve 125. This applies the same control pressure to both branch circuits, with each circuit having a steering control valve, namely valves 171 and 173. When it is desired to obtain non-uniform operation of the transmissions, either of the handles 101 or 102 may be operated to vary the control pressures applied to the displacement controls for the associated hydrostatic transmission. The relation of rotation of the handle 100 to the establishment of control pressures by the pressure-reducing valve 125 is shown in the graph of FIG. 3 wherein the control pressure values $(a)$, $(b)$ and $(c)$ correspond to those given in FIG. 4. It will be noted that initial rotation of the handle determines the direction of operation with the magnitude of rotation of the handle determining the control pressure and, therefore, the speed of the hydrostatic transmissions.

As described previously, the steering control valve 171 is shown in one limit position and, as the handle 101 is moved, the valve spool progressively may be moved toward the other limit position and during movement will meter part of the control pressure fluid to tank through connection back to the directional control valve 142, with full movement of the steering control valve to an opposite limit position actually reversing the direction of control pressure fluid to the displacement controls.

When the steering control valve spool 180 is shifted to meter the control pressure, there is a pressure established in either of conduits 175 or 176 which is connected to tank by directional control valve 142 because of the orifices 197 and 195, respectively, which restrict flow to tank. This establishment of pressure along with a reduction of the control pressure upsets the balance on the displacement control to have the hydrostatic transmission operate at a reduced speed.

The steering control valve 173 has the output conduits 177 and 178, referred to previously, which correspond to the conduits 175 and 176 for the steering control valve 171. The conduits 177 and 178 connect into a displacement control, the same as shown in FIG. 2B for the pump and motor of the second hydrostatic transmission. Corresponding parts of the two steering control valves have been given the same reference numerals.

The horsepower control valve 140, shown in FIG. 2A, is a normally-open, three-way modulating valve in series with the pressure-reducing valve 125. The valve is biased closed by an adjustable spring 300 acting against the valve spool 301. Pressures existing at opposite sides of the variable orifice valve 112 are applied to opposite ends of the valve spool 301 with the pressure in advance of the variable orifice valve being applied thereto through a conduit 305 connecting to the conduit 111. The pressure downstream of the variable orifice valve is applied to the opposite end of the valve spool 301 through a conduit 306 connected into conduit 118 which senses the regulated pressure $P_R$. When the engine is operating at, or near, rated speed for any selected throttle setting, the pressure drop through the variable orifice valve exceeds the force of the spring 300 to maintain valve spool 301 in a raised position as viewed in FIG. 2A, allowing the control pressure to pass therethrough with no pressure loss. If the engine begins to operate below rated speed, the pressure drop across the variable orifice valve is reduced below the setting of the spring 300 which causes the valve spool 301 to move downwardly and restrict the flow path to the conduit 141 leading to the directional control valve and being exhausting the control pressure fluid to tank. This results in reducing the control pressure signal to resultingly reduce the speed of the hydrostatic transmissions and cause the vehicle speed to match the power capability of the engine. If the vehicle is moving straight ahead, the action of the horsepower control valve will result in equal, but reduced, control pressures on both hydrostatic transmissions to keep the vehicle moving on a straight path, but at a lower ground speed. If the vehicle is in a steer mode, a reduction of control pressure by the valve will reduce the control pressures at each hydrostatic transmission proportionally. A prior art construction of applicants' assignee had a valve to provide the same antistall result.

The horsepower control valve 140 is now modified to also provide over-pressure relief protection for the control pump 110. This action occurs by an over-pressure in conduit 305 acting to shift the valve spool 301 upwardly against the spring 300 and pressure $P_R$ to connect conduit 305 to tank. A condition causing such action would be when the oil used in the system is quite cold and will not properly flow through the variable orifice valve 112 whereby an over-pressure condition would exist in the conduit 305.

We claim:

1. A dual path hydrostatic transmission control for two hydrostatic transmissions each having a pump, a motor, and pressure-responsive displacement control means for one of the pump and motor comprising a first valve for establishing a control pressure for said two transmissions, a second valve for setting a direction of operation of said two transmissions, a single control member for operating both said first and second valves, a fluid circuit including said first and second valves and having two branch circuits downstream of said first and second valves with each branch circuit having one of said pressure-responsive displacement control means for the pump and motor, and a pair of steering control valves positioned one in each of said branch circuits for modifying the control pressure to affect action of said hydrostatic transmissions relative to each other.

2. Apparatus as defined in claim 1 wherein said first valve includes a control spring and movable cam follower for setting said control spring, said single control member being rotatable and a cam thereon coacting with said cam follower, said cam having a cam surface with a pair of inclined sections one to each side of a central section whereby said control spring may be set in either direction of rotation of said single control member.

3. Apparatus as defined in claim 1 including a third valve for horsepower control positioned in the fluid circuit ahead of said branch circuits and having a connection to tank, a control pump for generating control fluid under pressure for delivery to said first valve, a conduit leading from the control pump to said third valve, and means associated with the third valve responsive to an excessive pressure generated by the control pump to connect said conduit to tank.

4. Apparatus as defined in claim 3 including a variable orifice means connected to the outlet of the control pump to set a pressure differential dependent on the throttle setting of a prime mover, and said third valve includes a valve spool exposed at opposite ends to the differential pressures with one end thereof exposed to fluid pressure in said conduit.

5. A dual path hydrostatic transmission control for two hydrostatic transmissions each having a pump, a motor, and pressure-responsive displacement control means for one of the pump and motor comprising, variable means for establishing a control pressure, means for setting a direction of operation of said two transmissions, a single control member for operating both said variable means and said setting means, a fluid circuit including said variable means and said setting means and having two branch circuits downstream of said last-mentioned means with each branch circuit having one of said pressure-responsive displacement control means for the pump and motor, and a pair of steering control valve means positioned one in each of said branch circuits for modifying the control pressure to affect the action of said hydrostatic transmissions relative to each other, each steering control valve means having a first pair of lines defining said branch circuit and a second pair of lines connectable one to said variable means and the other to tank, and a valve operable to meter flow between said second pair of lines and obtain a reduced control pressure.

6. Apparatus as defined in claim 5 wherein the steering control valve means includes means to reverse the direction of flow of the control pressure fluid.

7. Apparatus as defined in claim 5 wherein the steering control valve means includes a housing with said valve having a spool movable therein, a manually operable handle connected to said valve spool for positioning thereof at either of or between two limit positions, grooves on said valve spool for metering the flow of control pressure fluid to tank as said valve member is moved from one limit position, and a flow path in said valve spool for reversing flow of control pressure fluid therethrough when the valve spool is shifted to the other limit position.

8. A control for a hydrostatic transmission having a variable displacement pump and a variable displacement motor, a pair of displacement controls associated one with each of the pump and motor and each control including a valve connected to a source of operating fluid under pressure and a pair of operating cylinders subjected to operating fluid dependent upon the position of the valve, a circuit for establishing a control pressure, means including a pair of lines extending to the valve of the pump displacement control for applying the control pressure to the valve for shift thereof in a direction dependent upon which of said lines has the control pressure, circuit means connecting said pair of lines to the opposite ends of the valve of the motor displacement control, and said circuit means including a shuttle valve to always apply the highest control pressure existing in either of said lines to the same end of the motor displacement control valve.

9. A control for a hydrostatic transmission having a variable displacement pump and a variable displacement motor, a pair of displacement controls associated one with each of the pump and motor and each control including a valve connected to a source of operating fluid under pressure and a pair of operating cylinders subjected to operating fluid dependent upon the position of the valve, a circuit for establishing a control pressure, means for applying the control pressure to each of the displacement control valves, and feedback means for each of the displacement control valves and responsive to the displacement position of the pump and motor to set the control valves at a null position, said feedback means for the motor displacement control valve including a cam to establish a certain non-linear relation between motor displacement and transmission speed to obtain a desired relation between transmission speed and said control pressure.

10. A control as defined in claim 9 wherein said motor includes a swashplate, said feedback means for the motor includes an arm connected to the control valve for the motor, a pair of springs acting oppositely on the arm, said cam being pivotally mounted and in engagement with one of the springs, and a linkage connected to said motor swashplate and engageable with the cam to convert motor swashplate movement into forces on said one spring.

11. A control for a hydrostatic transmission having a variable displacement pump and a variable displacement motor, a pair of displacement controls associated one with each of the pump and motor and each control including a valve connected to a source of operating fluid under pressure and a pair of operating cylinders subjected to operating fluid dependent upon the position of the valve, means for applying a control pressure to the valves of the pump and motor displacement controls, feedback means for each of said valves and each of said means including, an arm connected to the valve, a pair of springs acting oppositely on said arm, a linkage for indicating displacement and for varying the force applied to one of said springs, and means for adjusting the force on one of said springs to provide a null position for the valve when the swashplate of the associated pump or motor is at a predetermined position.

12. A control for a hydrostatic transmission having a variable displacement pump and a variable displacement motor, a pair of displacement controls associated one with each of the pump and motor and each control including a valve connected to a source of operating fluid under pressure and a pair of operating cylinders subjected to operating fluid dependent upon the position of the valve, each of said control valves being subjectable to a control pressure for positioning thereof, a pressure setting valve for setting a desired control pressure, and a steering control valve for modifying the control pressure set by the pressure setting valve, said steering control valve having a first pair of lines extending to said displacement controls and a second pair of lines connectable one to the pressure setting valve and the other to tank, and a valve spool manually operable to meter flow between said second pair of lines and obtain a reduced control pressure.

13. A control as defined in claim 12 wherein said valve spool has first and second limit positions with means to reverse the flow connections to the first pair of lines by movement of the valve spool from the first limit position to the second limit position.

14. A control for a hydrostatic transmission having a pump and a variable displacement motor, a displacement control associated with said motor and including a valve connected to a source of operating fluid under pressure and an operating cylinder subjected to operating fluid dependent upon the position of the valve, a circuit for establishing a control pressure, means for applying the control pressure to the displacement control valve, and feedback means for the displacement control valve and responsive to the displacement position of the motor to set the control valve at a null position, said feedback means for the motor displacement control valve including a cam to establish a certain non-linear relation between motor displacement and transmission speed to obtain a desired relation between transmission speed and said control pressure.

15. A control as defined in claim 14 wherein said motor includes a swashplate, said feedback means for the motor includes an arm connected to the control valve for the motor, a pair of springs acting oppositely on the arm, said cam being pivotally mounted and in engagement with one of the springs, and a linkage connected to said motor swashplate and engageable with the cam to convert motor swashplace movement into forces on said one spring.

16. A control for a hydrostatic transmission having a pump and a variable displacement motor having a swashplate, a displacement control associated with said motor and including a valve connected to a source of operating fluid under pressure and an operating cylinder subjected to operating fluid dependent upon the position of the valve, a circuit for establishing a control pressure, means for applying the control pressure to the displacement control valve, and feedback means for the displacement control valve and responsive to the displacement position of the motor to set the control valve at a null position, said feedback means for the motor displacement control valve including a spring, a linkage movable by the swashplate, and means operable by the linkage to apply varying rates of compression to said spring dependent on the displacement range of the motor to establish a certain nonlinear relation between motor displacement and transmission speed to obtain a desired relation between transmission speed and said control pressure.

17. Apparatus as defined in claim 1 including a third valve for horsepower control positioned in the fluid circuit ahead of said branch circuits and having a connection to tank, a control pump for generating control fluid under pressure for delivery to said first valve, a conduit leading from the control pump to said third valve, and means responsive to an excessive pressure generated by the control pump to connect said conduit to tank.

18. Apparatus as defined in claim 1 including a control pump for generating control fluid under pressure for delivery to said first valve, a third valve for horsepower control positioned in the fluid circuit ahead of said branch circuits and having a connection to tank, said third valve having a valve spool controlling flow to said branch circuits and said connection to tank, and means for applying a pressure signal to said valve spool of the third valve representative of engine speed whereby a reduction of engine speed below rated speed will open said connection to tank.

* * * * *